3,825,537
1-THIAZOLIN - 2 - YL (OR THIAZIN - 2 - YL)-2-
AMINOBENZIMIDAZOLES AND DERIVA-
TIVES THEREOF
Rudiger D. Haugwitz, Highland Park, and Venkatachala
Lakshmi Narayanan, Hightstown, N.J., assignors to
E. R. Squibb & Sons, Inc., Princeton, N.J.
No Drawing. Filed Feb. 28, 1972, Ser. No. 230,122
Int Cl. C07d 91/24, 93/06, 99/10
U.S. Cl. 260—243 R                        12 Claims

ABSTRACT OF THE DISCLOSURE

Thiazolinyl and thiazinyl derivatives of 2-aminobenzimidazoles are provided having the structure

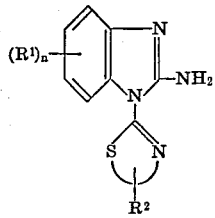

wherein $R^1$, $R^2$ and $n$ are defined hereinafter, and which are useful as antiinflammatory agents and disinfectants and as intermediates in the preparation of anthelmintic agents.

The present invention relates to thiazolinyl and thiazinyl derivatives of 2-aminobenzimidazoles having the structure

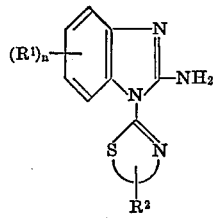

wherein $R^1$ is hydrogen, lower alkyl, lower alkoxy, aralkyl, aryl, substituted aryl, acyl, aroyl, lower alkylthio, aryloxy, arylthio, trifluoromethyl, nitro, halogen, cyano and amino. $R^2$ can be hydrogen, lower alkyl, arylalkyl, aryl or lower alkylaryl; $n$ is 1, 2, 3 or 4, preferably 1 or 2.

The radical

represents a 5- or 6-membered ring containing 3 or 4 carbon atoms, respectively, wherein the additional 2 or 3 carbon atoms (not shown) may include a substituent other than hydrogen as indicated above.

The lower alkyl groups represented by the above $R^1$ and $R^2$ groups include straight or branched chain aliphatic hydrocarbon radicals having up to seven carbon atoms, such as methyl, ethyl, propyl, isopropyl, butyl, isobutyl, t-butyl, amyl, hexyl, heptyl and the like.

The alkoxy group or that portion of the alkoxy-carbonyl group includes straight and branched chain radicals of up to and including seven carbon atoms, corresponding to the above alkyl groups, e.g., methoxy, ethoxy, propoxy, isopropoxy and the like. The aryloxy group or that portion of the aryloxy-carbonyl group includes any of the aryl groups set out below.

The term halogen includes each of the four halogens but fluorine and chlorine are preferred.

The amino groups include unsubstituted as well as mono- or di-lower alkyl-, arylalkyl-, lower alkylaryl- or arylamino wherein lower alkyl and aryl are as defined herein, such as methyamino, ethylamino, heptylamino, dimethylamino, diethylamino, ethylmethylamino, butylmethylamino, ethyldipropylamino, benzylamino and the like.

The term "aryl" includes monocyclic or bicyclic monovalent aromatic ring systems such as phenyl or naphthyl. These aryl radicals can include as substituents halogen, nitro, trifluoromethyl, alkoxy, amido or substituted amido or any of the alkyl groups mentioned hereinbefore.

The acyl and aroyl groups included herein are derived from hydrocarbon carboxylic acids of less than twelve carbon atoms, which may be exemplified by the lower alkanoic acids (e.g., formic, acetic, propionic, butyric, valeric, trimethyl acetic and caproic acids), the lower alkenoic acids (e.g., acrylic, methacrylic, crotonic, 3-butenoic and senecioic acids), the monocyclic aryl-carboxylic acids (e.g., benzoic and toluic acids), the monocyclic aryllower alkanoic acids [e.g., phenacetic, β-phenylpropionic, α-phenylbutyric, and 5-(p-methylphenyl)pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acid), the cycloalkyl and cycloalkenyl-lower alkanoic acids [e.g., cyclohexaneacetic, α-cyclopentanebutyric, 2-cyclopenteneacetic and 3-(3-cyclohexene)pentenoic acid], and the like.

Exemplary of compounds falling within the present invention include, but are not limited to, the following set out in Table A below:

TABLE A

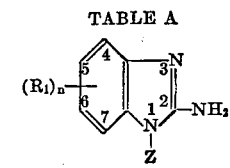

| | $R_1$ | n | Z |
|---|---|---|---|
| 1 | H | ---- | ![N-S ring] |
| 2 | Cl (5, 6) | 2 | Same as above. |
| 3 | NO$_2$ (5) | 1 | Do. |
| 4 | CH$_3$ (5,6) | 2 | Do. |
| 5 | —OCH$_3$ (5, 6) | 2 | Do. |
| 6 | NH$_2$ (5) | 1 | Do. |
| 7 | $\overset{O}{\underset{\|}{-\text{C}}}$CH$_3$ (6) | 1 | Do. |
| 8 | Br(6)CH$_3$ (4, 5) | 3 | |
| 9 | C$_4$H$_9$(5) | 1 | Do. |
| 10 | Br(5) | 1 | Do. |
| 11 | N(CH$_3$)$_2$(6) | 1 | ![N-S ring with CH$_3$] |
| 12 | —CH$_2$C$_6$H$_5$(6) | 1 | Same as above. |
| 13 | Cl(4, 7) | 2 | ![6-membered N-S ring] |
| 14 | $\overset{O}{\underset{\|}{\text{C}_2\text{H}_5\text{C}}}$ (5) | 1 | Same as above. |

TABLE A—Continued

| | $R_1$ | n | Z |
|---|---|---|---|
| 15 | $C_6H_5S-$ (5) | 1 | (thiazine ring) |
| 16 | phenyl—(5) | 1 | Same as above. |
| 17 | $CH_3O$ (5, 6) | 2 | (thiazole with $C_6H_5-$) |
| 18 | CN (4) | 1 | Same as above. |
| 19 | $C_6H_5CH_2$ (5) | 1 | Do. |
| 20 | $CF_3$ (6) | 1 | Do. |
| 21 | $C_6H_5O$ (5) | 1 | Do. |
| 22 | Cl—phenyl—(5) | 1 | (thiazole with $-CH_3$) |
| 23 | Cl (5) | 1 | (thiazole with $CH_3-$) |
| 24 | $C_3H_7$ (5) | 1 | (thiazine) |
| 25 | $C_2H_5$ (5) | 1 | (thiazole with $CH_3-$) |
| 26 | $C_4H_9$ (5) | 1 | (thiazole with $C_6H_5-$) |
| 27 | $CH_3S-$ | 1 | (thiazine) |
| 28 | $(CH_3)_2CH-$ (5) | 1 | Same as above. |
| 29 | $CH_3O$ (6) | 1 | Do. |
| 30 | $CH_3O$-phenyl-$CH_2-$ (5) | 1 | (thiazine) |
| 31 | $CF_3$ (5) | 1 | (thiazine) |
| 32 | $NO_2$ (6) | 1 | (thiazole with $CH_3-$) |
| 33 | CN (6) | 1 | (thiazole with phenyl) |
| 34 | H | 1 | (thiazine) |
| 35 | $NH_2$ (5) | 1 | (thiazole with $CH_3-$) |

Compounds of Formula I can be prepared by first converting the 2-aminobenzimidazole (II) into its salt (III) by employing metal hydrides such as sodium hydride, potassium hydride and liquid ammonia, metal amides, such as sodium amide, alkali metal alkoxides, such as sodium methoxide, potassium ethoxide or sodium butoxide.

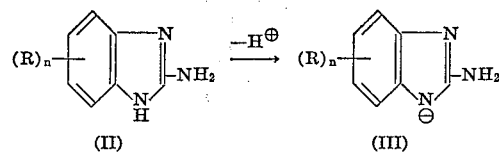

The above reaction can be brought about in a variety of nonprotic solvents such as aromatic hydrocarbons, e.g., benzene, toluene or xylene, or ethers such as ethyl ether or glyme, at temperatures ranging from about 0° to about 150° for periods of about one hour to twenty-four hours. A slight excess of the base is desirable; thus the molar ratio of 2-aminobenzimidazole II to base can range from about 1:1 to about 1:2.

The salt (III) is reacted with an aliphatic haloalkyl-isothiocyanate (IV) to yield thiourea (V) which undergoes intramolecular alkylation to form the 2-aminobenzimidazoles (I).

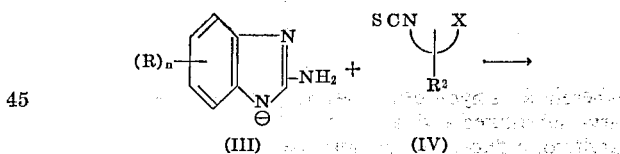

wherein X is Cl or Br and the portion

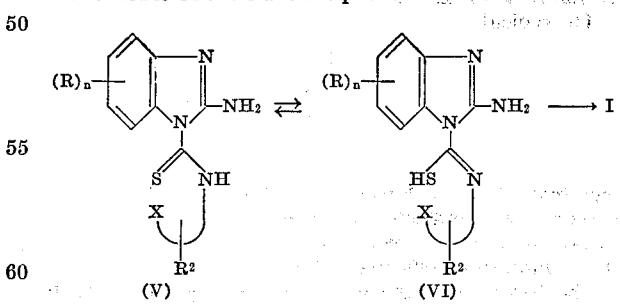

(which links N and X) in structure IV represents a chain of 2 or 3 carbon atoms one carbon atom of which may include an $R^2$ substituent other than hydrogen.

The molar ratio of 2-aminobenzimidazole (II) to haloalkylisothiocyanate (IV) can range from 1:1 to 1:1.5. The reaction time can vary from about 1 to about 24 hours at temperatures from about 25° to about 150°.

The preparation of a variety of benzimidazoles is well documented in Weissberger's *The Chemistry of Heterocyclic Compounds, Imidazole and Its Derivatives,* Interscience Publishers Co., New York, 1953.

It is to be understood that unsubstituted 2-aminobenzimidazoles III, that is where R is hydrogen, can be employed to form compounds of Formula I and thereafter other R radicals may be inserted in the 2-aminobenzimidazole ring in place of one or two hydrogens, employing conventional procedures as will be apparent to one skilled in the art.

Haloalkyl isothiocyanates (IV) are readily synthesized from their corresponding haloalkyl amines (VII) and thiophosgene:

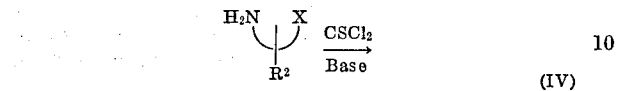

(IV)

Additional routes toward compounds of structure (IV) are described in Houben-Weyl's *Methoden Der Organischen Chemie*, Vol. 9, G. Thieme Verlay Stuttgart, 1955.

2-Aminobenzimidazoles containing a free imino hydrogen are virtually tautomeric systems, differing in the position of the imino hydrogen as seen below (A⇌B). These 2-aminobenzimidazoles react like tautomeric mixtures of the two possible forms. The reaction products (C and D) are not necessarily obtained in equal parts but in proportions that differ from compound to compound, substituents and reaction conditions having a pronounced effect on the course of the reaction.

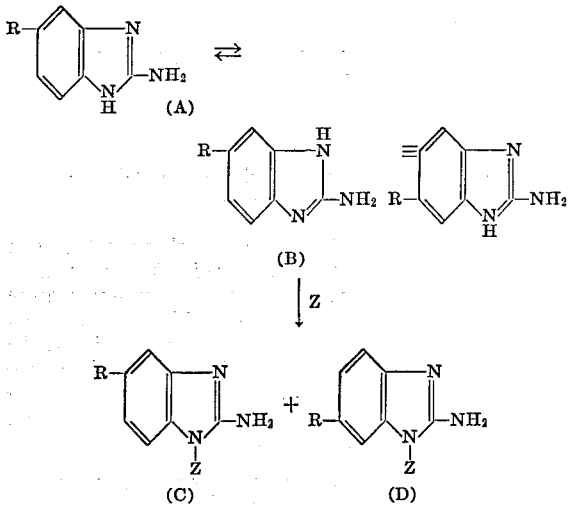

Alternatively, compounds of formula (I) can be prepared by reacting the corresponding N-thiazolinyl or N-thiazinyl-O-phenylene diamine of the structure VIII with a cyanogen halide (IX) (XCN wherein X is chlorine or bromine),

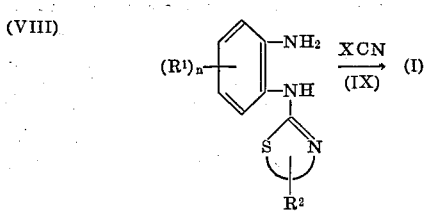

employing a molar ratio VIII:IX within the range of from about 1:1 to about 1:5. The reaction can be carried out at temperatures ranging from 0 to about 50° for periods of about one hour to 24 hours. Solvents which can be employed include water as well as aromatic hydrocarbons such as benzene or toluene or ethers, such as ethyl ether or isopropyl ether.

The N-thiazolinyl or N-thiazinyl-O-phenylene diamines starting materials VIII can be prepared as described in copending application Ser. No. 230,121 filed Feb. 28, 1972, entitled Thiazolinyl and Thiazinyl Derivatives of o-Phenylenediamines by Narayanan and Haugwitz, filed concurrently herewith.

Examples of 2-aminobenzimidazole starting materials II which can be employed herein include the following:

TABLE B

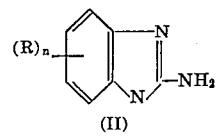

(II)

| | $R^1$ | n |
|---|---|---|
| 1 | 5—$NO_2$ | 2 |
| 2 | 5—$C_6H_5\overset{O}{\overset{\|}{C}}$— | 1 |
| 3 | 5—$C_6H_5CH_2$ | 1 |
| 4 | 5,6—di—$CH_3$ | 2 |
| 5 | 6—$(CH_3)_2N$— | 1 |
| 6 | 5,6—di—$CH_3$ | 2 |
| 7 | 5—$NO_2$ | 1 |
| 8 | H | — |
| 9 | 5—$C_2H_5O$ | 1 |
| 10 | 7—$CN$ | 1 |
| 11 | 5—$CH_3S$ | 1 |
| 12 | 5,6—di—$Cl$ | 2 |
| 13 | 5—F | 1 |
| 14 | 5—$CF_3$—⟨phenyl⟩— | 1 |
| 15 | 5—$CF_3$ | 1 |
| 16 | 6—$C_6H_5S$— | 1 |
| 17 | 5—$C_6H_5\overset{O}{\overset{\|}{C}}$— | 1 |

Examples of N-thiazolinyl or N-thiazinyl-O-phenylene diamine starting materials VIII which can be employed herein include the following:

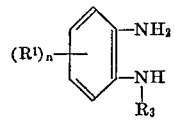

| | $R^1$ | n | $R^3$ |
|---|---|---|---|
| 1 | H | — | thiazoline |
| 2 | $CH_3$ (4, 5) | 2 | Same as above. |
| 3 | $Cl$ (4, 5) | 2 | Do. |
| 4 | $Cl$ (4) | 1 | Do. |
| 5 | $CH_3O$ (4) | 1 | Do. |
| 6 | $NO_2$ (3) | 1 | Do. |
| 7 | $NO_2$ (4) | 1 | Do. |
| 8 | $C_4H_9$ (4) | 1 | 4-methyl thiazoline |
| 9 | $Br$ (5) | 1 | 5-methyl thiazoline |
| 10 | $Br$ (3), $CH_3O$ (5) | 2 | Same as above. |
| 11 | $Br$ (5), $CH_3$(3, 4) | 3 | thiazine |
| | SXX | | |
| 12 | $C_4H_9O$ (4, 6) | 2 | Same as above. |
| 13 | $Cl$ (3, 5) | 2 | Do. |
| 14 | $C_2H_5O$(5), $NO_2$(3) | 2 | thiazine |
| 15 | p-$CH_3C_6H_4$ (4) | 1 | 5-phenyl thiazoline |

TABLE—Continued

| | R¹ | n | R³ |
|---|---|---|---|
| 16 | —C(=O)CH₃ (5) | 1 | (thiazoline ring with N, S) |
| 17 | N(CH₃)₂ (5) | 1 | (thiazoline ring with N, S, CH₃) |
| 18 | CH₂C₆H₅ (5) | 1 | Same as above. |
| 19 | C₆H₅S— (4) | 1 | (benzothiazole ring) |
| 20 | C₆H₅ (4) | 1 | Same as above. |

Examples of aliphatic haloalkylisothiocyanates which can be employed herein include the following:

SCN—CH₂CH₂Br

SCN—CH₂CH₂CH₂Cl

SCN—CH₂CH—Br
　　　　　|
　　　　　C₆H₅

SCN—CH₂CH—Cl
　　　　　|
　　　　　C₆H₄NO₂

SCN—CH₂—CH—CH₂Br
　　　　　　|
　　　　　　CH₃

SCN—CH₂CH—Cl
　　　　　|
　　　　　CH₃

The compounds of formula (I) form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic acid. Illustrative are the hydrohalides, especially the hydrochloride and hydrobromide which are preferred, sufate, nitrate, phosphate, oxalate, tartrate, maleate, fumarate, citrate, succinate, methanesulfonate, benzenesulfonate, toluenesulfonate, and the like.

The 2-aminobenzimidazole derivatives of the invention are also useful as anti-inflammatory agents. They may be used to decrease joint swelling, tenderness, pain and stiffness in mammalian species, e.g., in conditions such as rheumatoid arthritis. Compounds of formula (I) may be compounded for such use according to accepted pharmaceutical practice in oral dosage forms such as tablets, capsules, elixirs or powders for administration of about 100 mg. to 2 gm. per day, preferably 100 mg. to 1 gm. per day in two to four divided doses.

The compounds of formula (I) may also be used as surface disinfectants. About 0.01 to 1 per cent by weight of any of these substances may be dispersed on an inert solid or in a liquid such as water and applied as a dust or spray. They may be incorporated also, for example, in a soap or other cleaning agent, e.g., a solid or liquid detergent, detergent composition, for example; in general cleaning, in cleaning dairy barns or equipment or cleaning food handling or processing equipment. The compounds of formula (I) are also useful in the preparation of anthelmintic agents.

The following examples further illustrate and represent preferred embodiments of the invention:

EXAMPLE 1

2-Amino-1-(2-thiazolinyl-2-yl)benzimidazole

To a solution of 6.65 g. of 2-aminobenzimidazole in 150 ml. of dry glyme there is added 2.5 g. of sodium hydride. After the vigorous gas evolution has ceased the mixture is treated with 12.2 g. of 2-chloroethyl isothiocyanate and refluxed for thirty minutes. The solvent is evaporated and cautiously there is added ice. The resulting oily solid is filtered off and wash with little ice-cold acetone. The resulting solid is crystallized from acetone to yield 5.5 g., m.p. 187-190°.

Calc'd for $C_{10}H_{10}N_4S$: C, 55.02; H, 4.51; N, 25.67
Found: C, 54.88; H, 4.63; N, 25.84

EXAMPLE 2

2-Amino-1-(5,6-dihydro-4H-1,3-thiazin-2-yl)-benzimidazole

To a solution of 14.6 g. of 2-aminobenzimidazole in 350 ml. of dry glyme there is added 3.3 g. of sodium hydride and the mixture is stirred at room temperature for one hour. A solution of 19.8 g. of 3-bromopropyl isothiocyanate in 10 ml. dry glyme is then added and the mixture is refluxed for one hour. The solvent is evaporated and water is added to the residue. The resulting solid is filtered off and crystallized from glyme to yield 11.0 g. of product, m.p. 174-176.5°.

Calc'd for $C_{11}H_{12}N_4S$: C, 56.88; H, 5.20; N, 24.12
Found: C, 56.89; H, 5.36; N, 24.29

EXAMPLE 3

2-Amino-5,6-dichloro-1-(2-thiazolin-2-yl)-benzimidazole

To a solution of 6.1 g. of 2-amino-5,6-dichlorobenzimidazole in 100 ml. glyme there is added 0.9 g. sodium hydride and after one hour of stirring 3.6 g. of 2-chloroethyl isothiocyanate in 10 ml. of dry glyme. The mixture is refluxed for 1.5 hour. The solvent is evaporated under vacuum and water is added to the residue. The resulting solid is filtered off and crystallized from glyme to yield 1.9 g., m.p. 249–252°.

Calc'd for $C_{10}H_8N_4Cl_2S$: C, 41.82; H, 2.81; N, 19.51
Found: C, 42.04; H, 2.95; N, 19.43

EXAMPLE 4

2-Amino-5 (and 6) -methyl-1-(2-thiazolin-2-yl)benzimidazole

Following the procedure of Example 3 and replacing 2-amino-5,6-dichlorobenzimidazole with 2 - amino - 5-methylbenzimidazole the title compound is obtained, m.p. 210–223°.

Calcd for $C_{11}H_{12}N_4S$: C, 56.88; H, 5.20; N, 24.12
Found: C, 57.09; H, 5.47; N, 24.17

EXAMPLE 5

2-Amino-5 (and 6) -chloro-1-(2-thiazolin-2-yl)-benzimidazole

Following the procedure of Example 3 and replacing 2-amino-5,6 - dichlorobenzimidazole with 2 - amino - 5-chlorbenzimidazole the title compound is obtained, m.p. 205–226°.

Calc'd for $C_{10}H_9N_4ClS$: C, 47.53; H, 3.59; N, 22.17
Found: C, 47.35; H, 3.79; N, 22.10

EXAMPLE 6

2-Amino-5 (and 6) -nitro-1-(2-thiazolin-2-yl) benzimidazole

Following the procedure of Example 3 and replacing 2-amino-5,6-dichlorobenzimidazole with 2 - amino - 5-nitrobenzimidazole the title compound is obtained, m.p. 228–238°.

Calc'd for $C_{10}H_9N_5O_2S$: C, 45.62; H, 3.83; N, 26.60
Found: C, 45.34; H, 3.89; N, 26.86

EXAMPLE 7

2-Amino-1-(2-thiazolin-5-methyl-2-yl) benzimidazole

To a suspension of 2 g. of 2-(o-aminoanilino) - 5-methyl-2-thiazoline in 10 ml. of water there is added in portions 2.2 g. of cyanogen bromide. The solid changes slowly into an oil. After 15 minutes there is added sodium bicarbonate solution and the resulting solid is filtered off, crystallized from glyme-petroleum ether to yield 0.9 g. m.p. 153–155°.

Calc'd for $C_{11}H_{12}N_4S$: C, 56.87; H, 5.21; N, 24.12
Found: C, 56.59; H, 5:30; N, 24.03

EXAMPLES 8 TO 42

Following the procedure of Examples 1 to 6 but substituting the 2-aminobenzimidazole derivative shown in column 1 of Table I below and the aliphatic haloalkylisothiocyanate shown in column 2, the product shown in column 3 is obtained.

Where the 2-aminobenzimidazole starting material is mono-substituted and includes a substituent at the 5 or 6 position, then the product shown in column 3 will include the 6-tautomer or 5-tautomer respectively; where the 2-aminobenzimidazole starting material is monosubstituted and includes a substituent at the 4 or 7 position, then the product shown in column 3 will include the 7-tautomer or 4-tautomer, respectively.

TABLE I

| Example | $R^1$ (position) | n | Haloalkyl isothiocyanate | $(R^1)_n$ (position) | $R^2$ |
|---|---|---|---|---|---|
| 8 | $(CH_3)N-$ (5) | 1 | $SCN-CH_2-CH_2-Br$ | $(CH_3)N-$ (5) | |
| 9 | $C_2H_5O$ (6) | 1 | $SCN-CH_2-CH_2-Br$ | $C_2H_5O$ (6) | Same as above. |
| 10 | $C_4H_9$ (7) | 1 | | $C_4H_9$ (7) | Do. |
| 11 | $C_6H_{13}$ (5) | 1 | | $C_6H_{13}$ (5) | Do. |
| 12 | $NO_2$ (6) | 1 | | $NO_2$ (6) | Do. |
| 13 | $CH_3CO$ (6) | 1 | | $CH_3CO$ (6) | Do. |
| 14 | $C_6H_5(CH_2)_3$ (7) | 1 | $SCN-CH_2-CH_2-Br$ | $C_6H_5(CH_2)_3$ (7) | Do. |
| 15 | $C_6H_5$ (5) | 1 | $SCN-CH_2-CH_2-Br$ | $C_6H_5$ (5) | Do. |
| 16 | $C_6H_5\overset{O}{\underset{\|\|}{C}}$ (6) | 1 | $SCN-CH_2-CH_2-Br$ | $C_6H_5C$ | Do. |
| 17 | $C_6H_5CH_2$ (5) | 1 | $SCN-CH_2CH_2CH_2-Cl$ | $C_6H_5CH_2$ (5) | |
| 18 | $C_6H_5CO$ (5) | 1 | $SCN-CH_2CH_2CH_2-Cl$ | $C_6H_5CO$ (5) | Same as above. |
| 19 | $C_2H_5$ (5) | 1 | $SCN-CH_2CH_2CH_2-Cl$ | $C_2H_5$ (5) | Do. |
| 20 | $C_2H_5O$ (5) | 1 | $SCN-CH_2CH_2CH_2-Cl$ | $C_2H_5O$ (5) | Do. |
| 21 | $CH_3$ (5,6) | 2 | $SCN-CH_2CH_2CH_2-Cl$ | $CH_3$ (5,6) | Do. |
| 22 | $(C_2H_5)_2N$ (6) | 1 | $SCN-CH_2CH_2CH_2-Br$ | $(C_2H_5)_2N$ (6) | Do. |
| 23 | $C_2H_5S$ (4) | 1 | $SCN-CH_2CH_2CH_2-Br$ | $C_2H_5S$ (4) | Do. |
| 24 | $CN$ (6) | 1 | $SCN-CH_2CH_2CH_2-Br$ | $CN$ (6) | Do. |
| 25 | $NO_2$ (5) | 1 | $SCN-CH_2CH_2CH_2-Br$ | $NO_2$ (5) | Do. |
| 26 | $NO_2$ (5) | 1 | $SCN-CH_2CH_2CH_2-Br$ | $NO_2$ (5) | Do. |

EXAMPLE 5

2-Amino-5 (and 6) - chloro-1-(2-thiazolin-2-yl)- benzimidazole

Following the procedure of Example 3 and replacing 2-amino-5,6-dichlorobenzimidazole with 2-amino-5-chlorobenzimidazole the title compound is obtained, m.p. 205-230°.

Calc'd for C₁₀H₉ClN₄S: C, 47.52; H, 3.59; N, 22.17; and Cl, 14.03. Found: C, 47.16; H, 3.91; N, 21.80; and Cl, 14.25.

EXAMPLE 6

2-Amino-5,6-dichloro-1-(2-thiazolin-2-yl)-7- nitrobenzimidazole

Following the procedure of Example 4 and replacing 2-amino-5,6-dichlorobenzimidazole with 2-amino-5,6-dichloro-7- nitrobenzimidazole the title compound is obtained.

Calc'd for C₁₀H₇Cl₂N₅O₂S: C, 34.70; H, 2.04; N, 20.23; Cl, 20.49; and S, 9.26. Found: C, 34.59; H, 2.15; N, 19.96; Cl, 20.47; and S, 9.00.

EXAMPLE 7

2-Amino-1-(2-thiazolin-2-yl)-5-methylbenzimidazole

To a suspension of 7.3 g. of 2-amino-5- methylbenzimidazole in 40 ml. of chlorobenzene...

TABLE I—Continued

| | Column 1 | | Column 2 | Column 3 | |
|---|---|---|---|---|---|
| Example | R¹ (position) | n | Haloalkyl isothiocyanate | (R¹)ₙ (position) | R² |
| 27 | C₃H₇C(=O)— (4) | 1 | SCN—CH₂CH₂CH₂—Br | C₃H₇C(=O)— (4) | Do. |
| 28 | CF₃ (6) | 1 | SCN—CH₂CH₂CH₂—Br | CF₃ (6) | Do. |
| 29 | H | ---- | SCN—CH₂CHCl(C₆H₅) | H | (thiazoline with C₆H₅) |
| 30 | Br (5,6) | 2 | SCN—CH₂—CH₂Br | Br (5,6) | (thiazoline) |
| 31 | CH₃ (4) | 1 | SCN—CHCH₂Cl(CH₃) | CH₃ (4) | (thiazoline with CH₃) |
| 32 | C₆H₅S | 1 | SCN—CH₂CH₂Cl | C₆H₅S | (thiazoline) |
| 33 | p-CH₃C₆H₄ | 1 | SCN—CH₂CH₂Br | p-CH₃C₆H₄ | Same as above. |
| 34 | NO₂ (4) | 1 | SCN—CH₂CH₂Cl | NO₂ (4) | Do. |
| 35 | H | ---- | SCN—CHCH₂—Br(C₂H₅) | H | (thiazoline with C₂H₅) |
| 36 | C₄H₉C(=O) (4) | 1 | SCN—CH₂CH₂Cl | C₄H₉C(=O) (4) | (thiazoline) |
| 37 | C₂H₅O (7) | 1 | SCNCH₂CH₂Cl | C₂H₅O (7) | Same as above. |
| 38 | NO₂ (7) | 1 | SCNCH₂CH₂CH₂BR | NO₂ (7) | (thiazine) |
| 39 | Cl (5) | 1 | SCNCH₂CH₂CH₂Cl | Cl (5) | Same as above. |
| 40 | C₅H₁₁ (5) | 1 | SCNCH₂CH₂CHBr(C₆H₅) | C₅H₁₁ (5) | (thiazine with C₆H₅) |
| 41 | H | ---- | SCNCH₂CH₂CHCl(C₆H₅) | H | Same as above. |
| 42 | CH₃S— (7) | 1 | SCNCH₂CH₂CH₂Br | CH₃S— (7) | (thiazine) |

EXAMPLES 43 TO 47

Following the procedure of Examples 7 but substituting the 2-(o-aminoanilino)-5-methyl-2-thiazoline with N-thiazinyl or N-thiazolinyl-O-phenylenes as shown in Column 1 of Table II the product shown in Column 2 is obtained:

TABLE II

| Example | Column 2 R¹ (position) | n | Column 2 R¹ (position) | n | R² |
|---|---|---|---|---|---|
| 43 | H | | H | 1 | (thiazoline) |
| 44 | CH₃ (4,5) | 2 | CH₃ (5,6) | 2 | Same as above. |
| 45 | NO₂ (4) | 1 | NO₂ (5) | 1 | Do. |
| 46 | CH₃ (4,5) | 2 | CH₃ (5,6) | 2 | (thiazine) |
| 47 | NO₂ (4) | 1 | NO₂ (5) | 1 | Same as above. |

What is claimed is:

1. Compounds of the structure

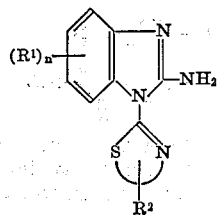

wherein R¹ is selected from the group consisting of hydrogen; alkyl; alkoxy; arylalkyl; aryl; aryl substituted with a substituent selected from the group consisting of halo, nitro, trifluoromethyl, alkoxy, and alkyl; aryloxy; an acyl group having less than 12 carbon atoms selected from the group consisting of lower alkanoyl, lower alkenoyl, monocarbocyclic aroyl, monocarbocyclic aryl-lower alkanoyl, cycloalkanoyl, cycloalkenoyl, cycloalkyl-lower alkanoyl, and cycloalkenyl-lower alkanoyl; alkylthio, arylthio; trifluoromethyl; nitro; halo; cyano; and amino; R² is selected from the group consisting of hydrogen, alkyl, arylalkyl, aryl, and alkylaryl;

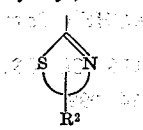

represents a 5 or 6-membered ring selected from the group consisting of

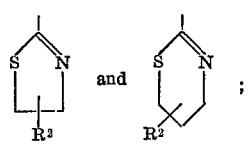

n is 1, 2, 3 or 4; wherein the term alkyl refers to alkyl groups having up to 7 carbon atoms; wherein the term alkoxy refers to alkoxy groups having up to 7 carbon atoms; wherein the term aryl refers to phenyl or naphthyl; wherein the term monocarbocyclic aryl refers to phenyl; and physiologically acceptable acid-addition salts thereof.

2. Compounds in accordance with Claim 1 having the structure

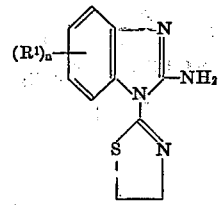

3. Compounds in accordance with Claim 1 having the structure

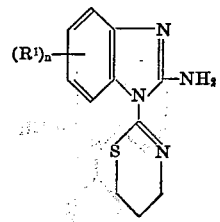

4. A compound in accordance with Claim 1 having the structure

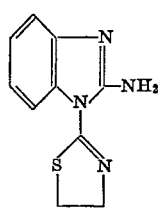

5. A compound in accordance with Claim 1 having the structure

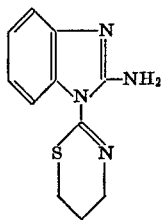

6. A compound in accordance with Claim 1 having the structure

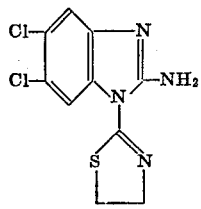

7. A compound in accordance with Claim 1 having the structure

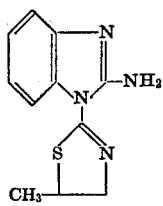

8. A compound in accordance with Claim 1 having the structure

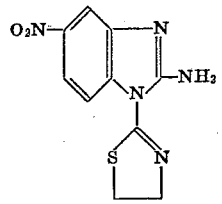

and/or its N-NO₂ tautomer.

9. A compound in accordance with Claim 1 having the structure

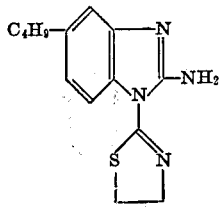

and/or its 6-C₄H₉ isomer.

10. A compound in accordance with Claim 1 having the structure

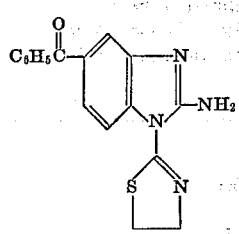

and/or its

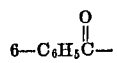

tautomer.

11. A process for preparing compounds as defined in Claim 1 which comprises reacting a benzimidazole of the structure

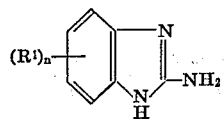

wherein R¹ and n are as defined in Claim 1, with a base selected from the group consisting of metal hydrides, liquid ammonia, metal amides, and alkali metal alkoxides, to form a salt of the structure

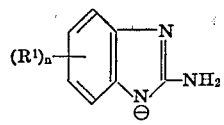

and reacting the salt with an aliphatic haloalkyl isothiocyanate.

12. A process for preparing a compound as defined in Claim 6 which comprises reacting a benzimidazole of the structure

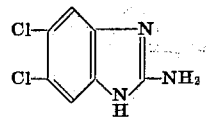

with a base selected from the group consisting of metal hydrides, liquid ammonia, metal amides, and alkali metal alkoxides, to form a salt of the structure

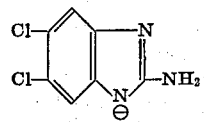

and reacting the salt with 2-chloroethyl isothiocyanate.

References Cited

UNITED STATES PATENTS

| | | | |
|---|---|---|---|
| 3,399,208 | 8/1968 | Holan et al. | 260—306.7 |
| 3,574,203 | 4/1971 | Conover et al. | 260—243 R |

RICHARD J. GALLAGHER, Primary Examiner

U.S. Cl. X.R.

260—306.7, 309.2, 454, 999

UNITED STATES PATENT OFFICE
CERTIFICATE OF CORRECTION

Patent No. 3,825,537   Dated July 23, 1974

Inventor(s) Rudiger D. Haugwitz & Venkatachala L. Narayanan

It is certified that error appears in the above-identified patent and that said Letters Patent are hereby corrected as shown below:

Column 1, lines 33 to 42, the formula should be labeled: -- I --.

Column 4, line 49, delete complete line which reads: " wherein X is Cl or Br and the portion ".

Column 4, line 62, after formulas V and VI, insert the following: -- wherein X is Cl or Br and the portion  --.

Column 5, lines 8 to 13, the structure should be labeled: -- VII --.

Column 5, lines 30 to 36, the formulas for B should read:

(B)

Column 6, lines 61 to 63, Column $R^1$, delete that portion which reads: " SXX ".

Column 13, Example 43, Table II, Column n, delete "H" and insert -- H -- under column $R^1$ (position).

Column 15, Claim 8, that portion of the last line that reads: " N-$NO_2$ " should be: -- 6-$NO_2$ --.

Signed and sealed this 5th day of November 1974.

(SEAL)
Attest:

McCOY M. GIBSON JR.
Attesting Officer

C. MARSHALL DANN
Commissioner of Patents